(12) United States Patent
Hsiao et al.

(10) Patent No.: US 7,657,170 B2
(45) Date of Patent: Feb. 2, 2010

(54) MOTOR STRUCTURE WITH BUILT-IN LENS

(75) Inventors: Cheng-Fang Hsiao, Tu-Cheng (TW); Ching-Hsing Huang, Tu-Cheng (TW); Wun-Chang Shih, Tu-Cheng (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 539 days.

(21) Appl. No.: 11/309,838

(22) Filed: Oct. 10, 2006

(65) Prior Publication Data

US 2008/0085109 A1    Apr. 10, 2008

(51) Int. Cl.
G03B 13/00 (2006.01)
G02B 15/14 (2006.01)
G02B 7/02 (2006.01)

(52) U.S. Cl. .................. 396/133; 359/696; 359/819
(58) Field of Classification Search .............. 396/133; 359/695, 696
See application file for complete search history.

(56) References Cited

U.S. PATENT DOCUMENTS

| | | | | | |
|---|---|---|---|---|---|
| 4,626,077 A | * | 12/1986 | Yamamoto | ................ | 359/696 |
| 6,064,533 A | * | 5/2000 | Kenin et al. | ................ | 359/695 |
| 7,039,309 B2 | | 5/2006 | Hsiao | ................ | 396/85 |
| 7,443,618 B2 | * | 10/2008 | Hsiao et al. | ................ | 359/819 |
| 7,522,352 B2 | * | 4/2009 | Huang et al. | ................ | 359/696 |
| 7,535,662 B2 | * | 5/2009 | Hong et al. | ................ | 359/819 |
| 7,574,127 B2 | * | 8/2009 | Hong et al. | ................ | 396/133 |
| 2009/0097837 A1 | * | 4/2009 | Chen et al. | ................ | 396/133 |

FOREIGN PATENT DOCUMENTS

| CN | 200420000592.9 | 2/2005 |
|---|---|---|
| CN | 20050003398.0 | 3/2006 |

* cited by examiner

Primary Examiner—Melissa J Koval
(74) Attorney, Agent, or Firm—Frank R. Niranjan

(57) ABSTRACT

A motor structure with a built-in lens includes a motor (30), and a lens unit (50) received in the motor and driven by the motor to telescopically move along an axial thereof. An internal thread (344) is formed on an inner surface of the motor. The lens unit includes an upper portion (51) and a lower portion (54). An external thread (544) is formed on an outer surface of the lower portion of the lens unit to threadedly engage with the internal thread of the motor. A dust cover (70) is arranged on the upper portion of the lens unit and defines an opening (71) for the upper portion of the lens unit to move therethrough. The lower portion of the lens unit is limited in the cover so that the external thread is prevented from being exposed to the environment during movement of the lens unit.

15 Claims, 4 Drawing Sheets

MOTOR STRUCTURE WITH BUILT-IN LENS

FIELD OF THE INVENTION

The present invention relates generally to cameras, and more particularly to a camera having a stepping motor with built-in lens.

DESCRIPTION OF RELATED ART

Usually we need a camera to record memorable moments. The designs of cameras have evolved toward lightweight and compactness, so have the currently popular digital cameras. Conventionally, an auto focus structure is used for controlling the telescopic movement of a lens of the camera.

The auto focus structure of the camera focuses on an object by comparing with the image on an image sensor. The image sensor is either a charge coupled device (CCD) sensor or a complementary metal oxide semiconductor (CMOS) sensor, and is controlled by a central processing unit (CPU) installed inside the digital camera. In the beginning, the lens moves back and forth around its original position (static position). As the lens moves, the CPU compares the image from the lens with the image in the image sensor. Finally, as the lens moves to the position where the image is the clearest, then the lens stops at the position. In this case, the lens has to be continuously driven back and forth by a stepping motor. The stepping motor includes a cylinder-shaped stator with windings wound thereon, and a rotor received in the stator. The lens is received in the rotor. An internal thread is formed on an inner surface of the rotor, and an external thread screwed on the internal thread is formed on an outer surface of the lens. When a current is applied to the windings of the stator, the rotor is driven to rotate by the interaction of the alternating magnetic field established by the stator and the magnetic field of the rotor. The rotation of the rotor then turns to the axial telescopic movement of the lens through the action between the internal thread of the rotor and the external thread of the lens. At the moment when the CPU detects a clearest image as the lens moves back and forth, a stop signal is simultaneously sent to the motor. Therefore, the lens stops at the best focal position (static position).

However, during the telescopic movement of the lens and when the lens is extended, the external thread formed on the lens is exposed to the environment and may be contaminated with dust. The dust adhered to the thread can fall into the camera when the lens is retracted into the camera. If the dust falls onto the surface of the sensor, which is located under the lens, the quality of the obtained image is degraded. In addition, because the surface of the sensor is very delicate, it is not easy to remove away the dust adhered to the surface. Therefore, it is important to prevent dust from adhering to the surface of the sensor.

SUMMARY OF THE INVENTION

According to a preferred embodiment of the present invention, a motor structure with built-in lens includes a motor, and a lens unit received in the motor and driven by the motor to telescopically move along an axial thereof. An internal thread is formed on an inner surface of the motor. The lens unit includes an upper portion and a lower portion. An external thread is formed on an outer surface of the lower portion of the lens unit to threadedly engage with the internal thread of the motor. A dust cover is arranged on the upper portion of the lens unit and defines an opening for the upper portion of the lens unit to move therethrough. The lower portion of the lens unit is limited in the cover and prevented from being exposed to a surrounding environment of the motor structure with built-in lens unit during movement of the lens unit.

Other advantages and novel features of the present invention will be drawn from the following detailed description of a preferred embodiment of the present invention with attached drawings, in which:

BRIEF DESCRIPTION OF THE DRAWINGS

Many aspects of the present motor structure with built-in lens can be better understood with reference to the following drawings. The components in the drawings are not necessarily drawn to scale, the emphasis instead being placed upon clearly illustrating the principles of the present motor structure with built-in lens. Moreover, in the drawings, like reference numerals designate corresponding parts throughout the several views.

DETAILED DESCRIPTION OF THE INVENTION

Figure 1:
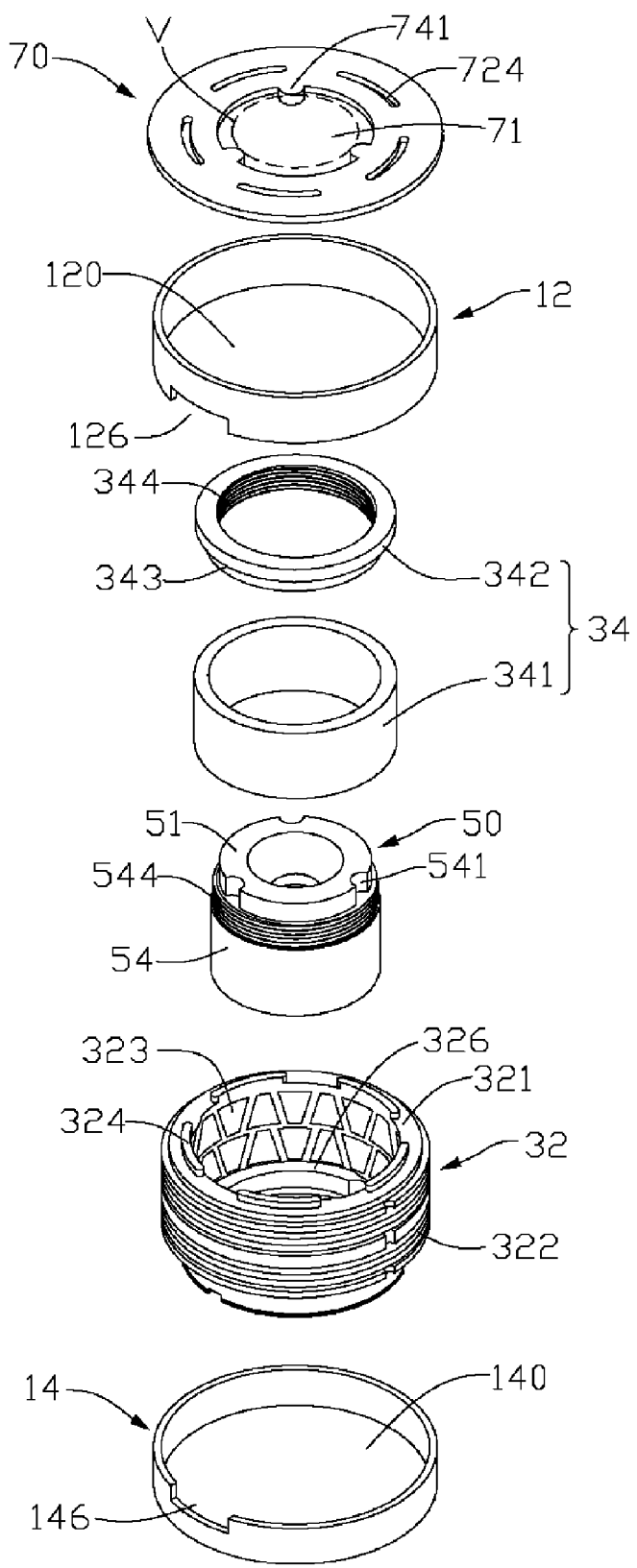
FIG. 1 is an isometric, exploded view of a motor structure with built-in lens in accordance with a preferred embodiment of the present invention.
Figure 2:
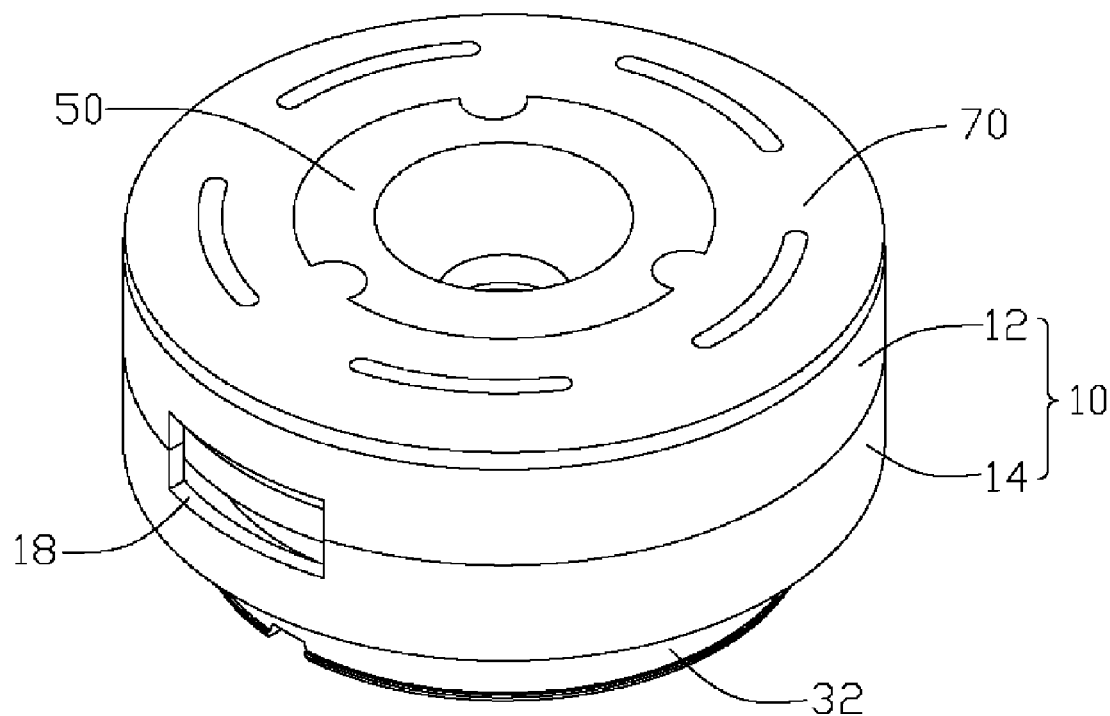
FIG. 2 is an assembled view of FIG. 1.
Figure 3:
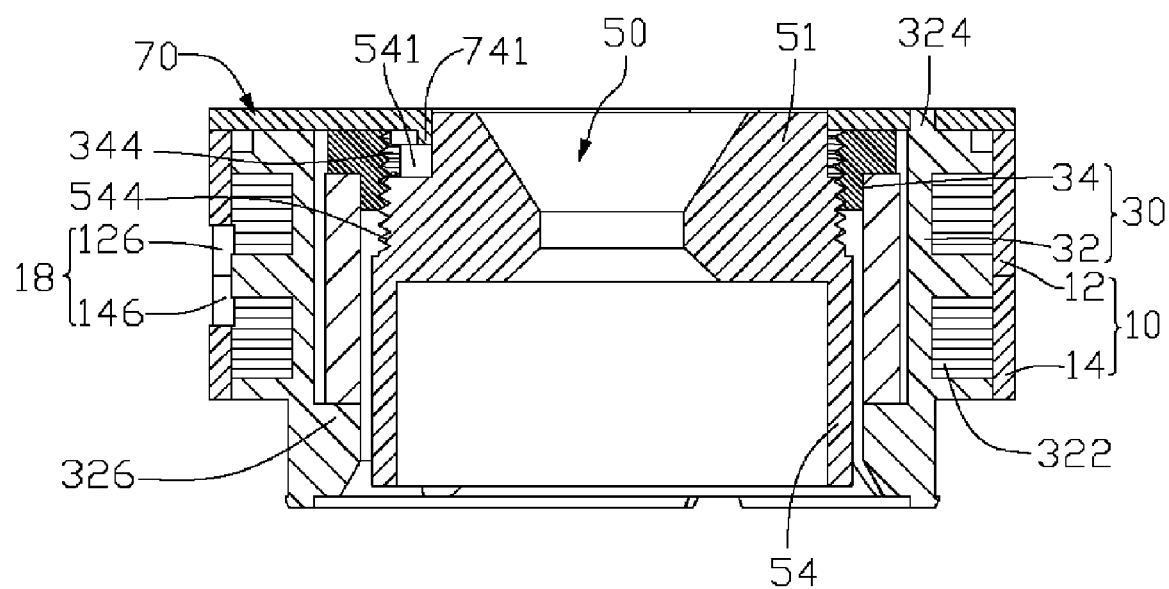
FIG. 3 shows a cross-sectional view of the motor structure with built-in lens of FIG. 2.

Referring to FIGS. 1 through 3, a motor structure with built-in lens according to a preferred embodiment of the present invention includes a lens mount 10, a motor 30 received in the lens mount 10, a lens unit 50 being drivable by the motor 30, and a dust cover 70 arranged on a top end of the lens mount 10.

The lens mount 10 includes a lower barrel 14 and an upper barrel 12 located above and facing to the lower barrel 14. Each of the upper and lower barrels 12, 14 is cylindrical-shaped and defines a through hole 120, 140 in a center thereof. A cutout 126 is defined in a lower end of the upper barrel 12, while a cutout 146 is defined in an upper end of the lower barrel 14. When the two barrels 12, 14 are assembled together, the lower and upper ends of the two barrels 12, 14 abut each other, and thus cooperatively form the lens mount 10. The two cutouts 126, 146 of the two barrels 12, 14 cooperatively define a passage 18 in the lens mount 10 for extension of wires (not shown) therethrough to connect the motor 30 with a power source (not shown). The through holes 120, 140 of the two barrels 12, 14 cooperatively form a space receiving the motor 30 and the lens unit 50 therein.

The motor 30 is received in the space of the lens mount 10. The motor 30 is cylindrical-shaped and hollow. The outer diameter of the motor 30 is approximately the same as the inner diameter of the lens mount 10. The motor 30 includes a stator 32 and a rotor 34 rotatably received in the stator 32. The stator 32 includes a stator core 321 having a plurality of poles 323 and windings 322 wound around the stator core 321. The windings 322 electrically connect with the wires. A flange 326 extends inwardly and radially from an inner surface of a bottom end of the stator core 321. Five protrusions 324 extend upwardly from a top end of the stator core 321. The protrusions 324 are evenly arranged and spaced from each other along a circumferential direction of the stator core 321. The rotor 34 includes a permanent magnet 341 and a hollow shell 342 mounted on a top end (not labeled) of the magnet 341. A bottom end (not labeled) of the magnet 341 opposite to the top end thereof abuts against the flange 326 of the stator 32 when the magnet 341 is received in the stator 32. The magnet 341 is cylindrical-shaped with an outer diameter approximately the same as an inner diameter of the stator 32, and an inner diameter larger than an outer diameter of the lens unit 50. The shell 342 has an outer diameter approximately the same as the outer diameter of the magnet 341, and an inner diameter smaller than the inner diameter of the magnet 341 and approximately the same as the outer diameter of the lens unit 50. The shell 342 defines an annular notch 343 in a bottom end thereof, and thus an outer surface of the shell 342 is step-shaped. The bottom end of the shell 342 has an outer diameter approximately the same as the inner diameter of the magnet 341, whereby the bottom end of the shell 342 can be fittingly inserted into the top end of the magnet 341. An internal thread 344 is formed on an inner surface of the shell 342.

The lens unit 50 is linearly movably received in the hollow shell 342 of the rotor 34. The lens unit 50 includes an upper portion 51 having a relatively smaller outer diameter, and a lower portion 54 having a relatively larger outer diameter. The outer diameter of the lower portion 54 of the lens unit 50 is approximately the same as the inner diameter of the shell 342. An external thread 544 is formed in an outer surface of an upper end of the lower portion 54 of the lens unit 50 to threadedly engage with the internal thread 344 of the rotor 34. Three grooves 541 are defined in an outer surface of the upper portion 51 of the lens unit 50. The grooves 541 are equidistantly spaced from each other, and extend through the upper portion 51 of the lens unit 50 along an axial direction thereof.

The dust cover 70 is ring-shaped, defining an opening 71 in a central portion thereof. An outer diameter of the cover 70 is the same as an outer diameter of the lens mount 10. An inner diameter of the cover 70 is smaller than the outer diameter of the lower portion 54 of the lens unit 50, and approximately the same as the outer diameter of the upper portion 51 of the lens unit 50. Three bulges 741 extend inwardly from an inner circumferential of the cover 70, corresponding to the grooves 541 of the upper portion 51 of the lens unit 50. The bulges 741 are equidistantly spaced from each other. Each bulge 741 extends inwardly and then downwardly from the cover 70. A height of the each bulge 741 along an axial direction thereof is larger than that of the cover 70, but smaller than a depth of the groove 541 of the lens unit 50. Five slots 724 are defined in the cover 70 corresponding to the protrusions 324 of the stator 32. The slots 724 are also equidistantly spaced from each other along a circumferential direction of the cover 70.

When assembled, the upper barrel 12 is mounted on the lower barrel 14 to define the space for receiving the motor 30 therein. The lens unit 50 is movable received in the hollow motor 30 with the external thread 544 screwing on the internal thread 344 of the shell 342 of the rotor 34. The dust cover 70 is mounted on the upper barrel 12. The protrusions 324 of the stator 32 are fitted in the slots 724 of the cover 70. An outer edge of a bottom face of the dust cover 70 is adhered to a top end of the upper barrel 12. Thus, the cover 70 is fixedly mounted on the motor structure with built-in lens and is prevented from rotation or movement along an axial thereof. Each bulge 741 extends into a corresponding groove 541 of the upper portion 51 of the lens unit 50, whereby rotation of the lens unit 50 is avoided.

Figure 4:
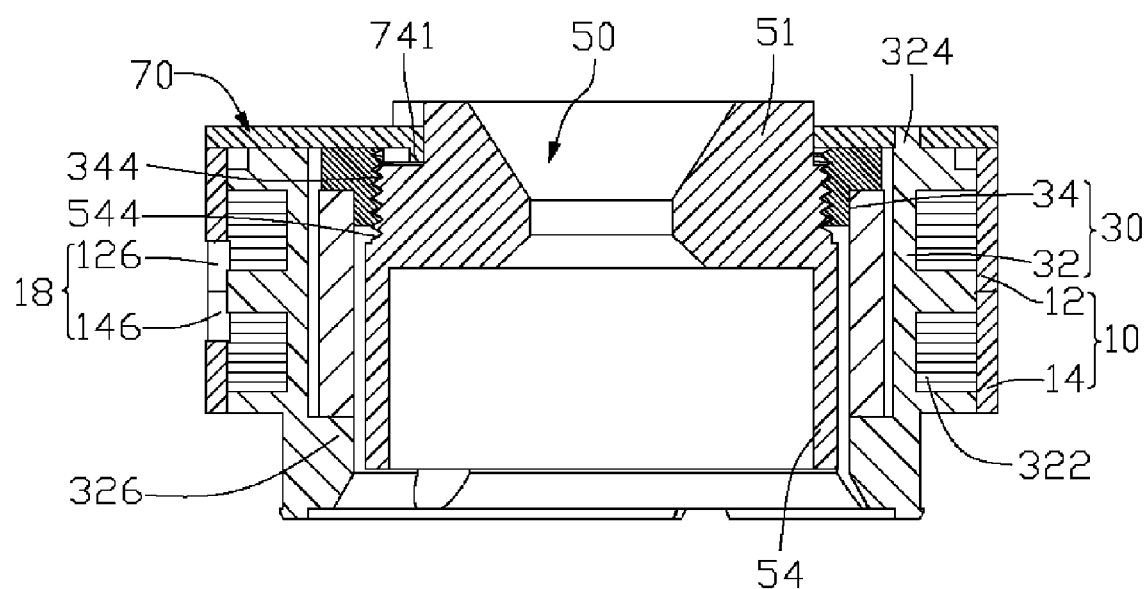
FIG. 4 is similar to FIG. 3, but showing that a lens unit of the motor structure with built-in lens is extended.

Referring to FIG. 4, during operation, a current is applied to the windings 322 of the motor 30 through the wires. The rotor 34 is driven to rotate by the interaction of the alternating magnetic field established by the stator 32 and the magnetic field of the rotor 34. The rotation of the rotor 34 then turns to the axial telescopic movement of the lens unit 50 through the action between the internal thread 344 of the rotor 34 and the external thread 544 of the lens unit 50. Therefore the motor 30 acts to drive the lens unit 50 into telescopic movement along the axial direction of the lens unit 50. As the motor 30 is directly built inside the cylindrical-shaped lens mount 10, a symmetrical ring shape structure is formed to improve the flexibility of the spatial disposition of the motor structure. The cover 70 has an inner diameter smaller than the outer diameter of the lower portion 54 of the lens unit 50; thus, the lower portion 54 of the lens unit 50 is limited in the lens mount 10. In other words, the external thread 544 formed on the lower portion 54 of the lens unit 50 is limited in the lens mount 10 by the dust cover 70.

During telescopic movement of the lens unit 50, the external thread 544 is prevented from exposing to a surrounding environment of the motor structure with built-in lens; dust thus can not adhere to the external thread 544 and then fall to a sensor (not shown) which is arranged under the lens unit 50. Therefore, the dust cover 70 is capable of suppressing influence of dust as much as possible and enabling operation of a camera incorporating the motor structure with built-in lens in accordance with the present invention with a high reliability. On the other hand, the cover 70 engages with the lens unit 50 to avoid rotation of the lens unit 50, resulting in a reliable telescopic axial movement of the lens unit 50. Thus, the camera with the dust cover 70 can achieve stable and accurate operation.

While the invention has been described in connection with what is presently considered to be the most practical and preferred embodiment, it is to be understood that the invention is not limited to the disclosed embodiment, but, on the contrary, is intended to accommodate various modifications and equivalent arrangements. The motor structure with built-in lens in accordance with the preferred embodiment of the present invention includes a cover 70 and a lens unit 50. The lens unit 50 has an upper portion 51 with an outer diameter smaller than an inner diameter of the cover 70, and a lower portion 54 with an outer diameter larger than an inner diameter of the cover 70. Thus, the external thread 544 formed on the lower portion 54 of the lens unit 50 is avoided from being exposed to the environment. The bulges 741 are received in the groove 541 of the upper portion 51. Actually, inner edges of the bulges 741 of the cover 70 cooperatively define a circle V (see FIG. 1). A center of the circle V is coincidental with the center of the cover 70 (also the center of the lens unit 50 and the motor 30). Thus when the diameter of the circle V is smaller than the outer diameter of the lower portion 54, the external thread 544 can not extend out of the cover 70.

What is claimed is:

1. A motor structure with built-in lens comprising:
   a motor forming an internal thread on an inner surface thereof;
   a lens unit received in the motor and driven by the motor to telescopically move along an axis thereof, the lens unit comprising an upper portion and a lower portion forming an external thread to threadedly engage with the internal thread of the motor on an outer surface of the lower portion of the lens unit; and
   a dust cover mounted an upper end of the motor, the cover defining an opening for the upper portion of the lens unit to telescopically move therethrough, the lower portion of the lens unit being limited in the cover and prevented from being exposed to a surrounding environment of the motor structure with built-in lens during movement of the lens unit;
   wherein the motor comprises a stator and a rotor rotatably disposed in the stator, a plurality of protrusions extending upwardly from a top end of the stator, the cover defining a plurality of slots receiving the protrusions of the stator therein.

2. The motor structure of claim 1, wherein an outer diameter of the upper portion of the lens unit is smaller than that of the lower portion of the lens unit.

3. The motor structure of claim 1, wherein at least one groove is defined in an outer surface of the upper portion of the lens unit, and the cover forms at least one bulge extending into the at least one groove of the lens unit.

4. The motor structure of claim 3, wherein the lens unit defines a plurality of grooves therein, and the cover forms a plurality of bulges thereon, the bulges extending into the grooves, respectively, the grooves being equidistantly spaced from each other along a circumferential direction of the upper portion of the lens unit.

5. The motor structure of claim 4, wherein the bulges extend inwardly and downwardly from an inner circumference of the cover, a height of each bulge along an axial direction thereof being smaller than a depth of each groove of the lens unit.

6. The motor structure of claim 1, wherein a flange extends radially and inwardly from a bottom end opposite to the top end of the stator, the rotor being mounted on the flange.

7. The motor structure of claim 6, wherein the rotor includes a cylinder-shaped magnet and a shell mounted on a top end of the magnet, the shell having a step-shaped outer surface and a bottom end engaging into the top end of the magnet, the internal thread of the motor being formed on an inner surface of the shell.

8. The motor structure of claim 1, further comprising a lens mount receiving the motor and lens unit therein, a passage being defined in the lens mount adapted for wires extending therethrough to electrically connect the motor to a power source.

9. A motor structure with built-in lens, comprising:
a lens mount;
a motor received in the lens mount and forming an internal thread on an inner surface thereof;
a lens unit received in the motor and driven by the motor to telescopically move along an axis thereof, the lens unit comprising an upper portion and a lower portion forming an external thread to threadedly engage with the internal thread of the motor on an outer surface of the lower portion of the lens unit; and
a cover mounted on a top end of the lens mount, the cover defining an opening for the upper portion of the lens unit to telescopically move therethrough, a diameter of an inner circumference of the cover defining the opening is smaller than an outer diameter of the lower portion of the lens unit;
wherein a plurality of bulges extends inwardly from the inner circumference of the cover toward the opening, and the upper portion of the lens unit defines a plurality of grooves receiving the bulges therein, respectively, a height of each bulge along an axial direction thereof being smaller than a depth of each groove of the lens unit.

10. The motor structure of claim 9, wherein an outer diameter of the upper portion of the lens unit is smaller than the diameter of the inner circumference of the cover.

11. The motor structure of claim 9, wherein the motor comprises a stator and a rotor rotatably disposed in the stator, a plurality of protrusions extending upwardly from a top end of the stator, the cover defining a plurality of slots receiving the protrusions of the stator therein, respectively.

12. The motor structure of claim 11, wherein a flange extends radially and inwardly from a bottom end of the stator opposite to the top end thereof, the rotor being mounted on the flange.

13. A motor structure with built-in lens comprising:
a lens mount defining an inner space therein;
a hollow stator fixedly received in the inner space;
a rotor rotatably received in the stator, the rotor having an internal thread defined in an upper portion thereof;
a lens unit received in the rotor and having an upper portion defining at least a groove extending axially, an external thread located behind the at least a groove and threadedly engaging with the internal thread of the rotor; and
a dust cover mounted on top ends of the stator and the lens mount, the dust cover having an inner circumference defining an opening therethrough and at least a bulge extending from the inner circumference toward the opening, the at least a bulge being fitted in the at least a groove of the lens unit, wherein the upper portion of the lens unit is telescopically movable through the opening of the dust cover and the external thread is always located behind the dust cover.

14. The motor structure of claim 13, wherein the stator forms protrusions on a top end thereof, the protrusions extending through the dust cover.

15. The motor structure of claim 13, wherein the at least a groove is located in an outer circumferential periphery of the upper portion of the lens unit.

* * * * *

UNITED STATES PATENT AND TRADEMARK OFFICE
CERTIFICATE OF CORRECTION

| | | |
|---|---|---|
| PATENT NO. | : 7,657,170 B2 | Page 1 of 1 |
| APPLICATION NO. | : 11/309838 | |
| DATED | : February 2, 2010 | |
| INVENTOR(S) | : Hsiao et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 654 days.

Signed and Sealed this

Thirtieth Day of November, 2010

David J. Kappos
*Director of the United States Patent and Trademark Office*